March 29, 1966 F. SPEER 3,243,248
SPRING LOADED SPECTACLE FRAME HINGE
Filed June 18, 1962
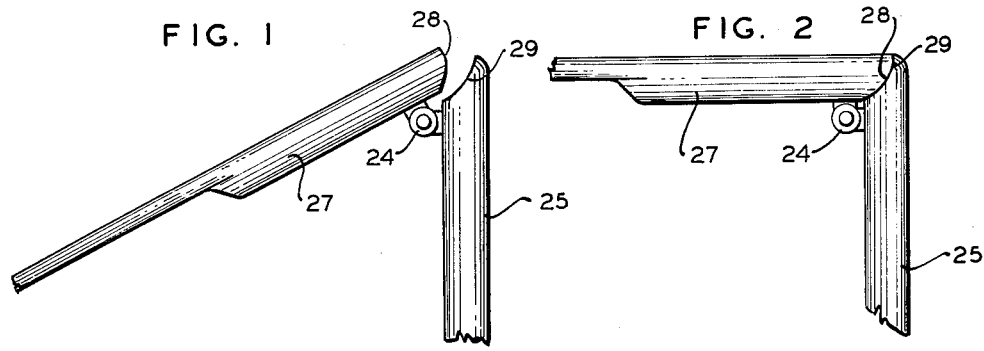
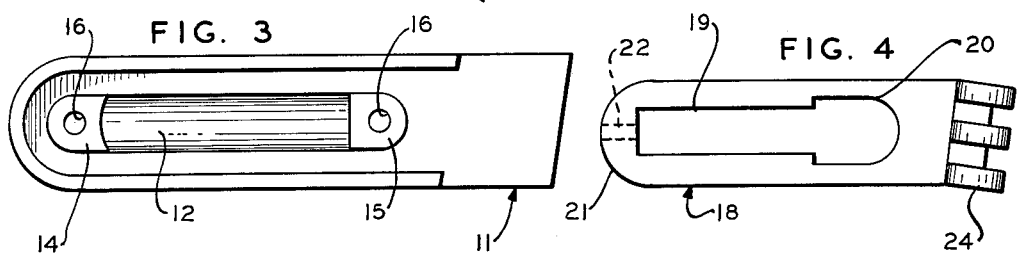
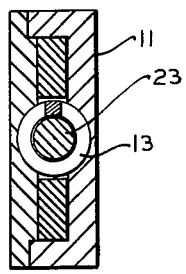
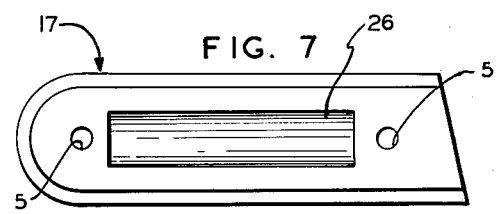
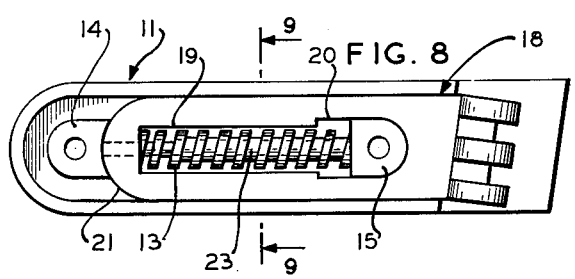
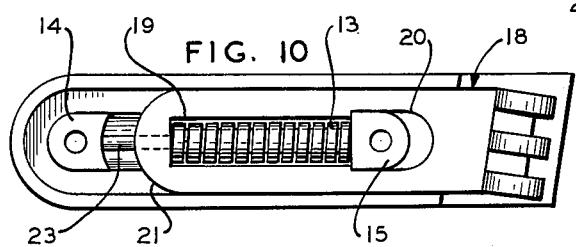
INVENTOR.
FREDERICK SPEER
BY Norman N. Popper
ATTORNEY

United States Patent Office 3,243,248
Patented Mar. 29, 1966

3,243,248
SPRING LOADED SPECTACLE FRAME HINGE
Frederick Speer, 131 Briarhill Circle, Springfield, N.J.
Filed June 18, 1962, Ser. No. 203,084
1 Claim. (Cl. 351—153)

The invention relates generally to spectacle frame hinges, and specifically to spring loaded spectacle frame hinges.

It is an object of the invention to provide a spring loaded spectacle hinge.

It is another object of the invention to provide a spectacle frame hinge which tends normally to urge the temples of a spectacle frame to pivot inwardly, and lightly seize the temples of the wearer, so that the spectacle frame rides high on the nose, and will not slide down.

Yet another object of the invention is to provide a spectacle frame hinge which may be mounted in a housing, and sold separately for installation in temples or may be installed in an enclosure or seat in a temple of the spectacle frame.

A still further object of the invention is to provide a spectacle frame hinge which is neat, unobtrusive, and esthetically pleasing, since it is substantially concealed in a temple, with a cover plate which may in color conform to the color of the temple.

These objects and advantages as well as other objects and advantages may be attained by the device, shown by way of illustration of the invention, in the drawings in which:

FIGURE 1 is a top plan view of a portion of a spectacle frame with the hinge at mid-position;

FIGURE 2 is a similar view with the hinge at extended position;

FIGURE 3 is an elevational view of an oblong, hollow, hinge enclosure;

FIGURE 4 is an elevational view of a slotted plate and one part of a hinge;

FIGURE 5 is a view of a hinge spring;

FIGURE 6 is a view of a hinge pin;

FIGURE 7 is a view of the enclosure cover;

FIGURE 8 is a view of the hinge assemblage with the hinge retracted;

FIGURE 9 is a cross-sectional view taken on the line 9—9 in FIGURE 8; and

FIGURE 10 is a view of the hinge assembly with the hinge extended.

It is recognized, in the spectacle frame art, that spectacle frames become deformed during normal usage; the temples may only loosely engage the cranium and the frames, instead of riding high on the bridge of the nose, tend to slide forward, permitting the lenses to assume an undesirable position. Hinges have been devised to cause the temples to engage firmly the cranium, but they have lacked the durability necessary to permit long continued and frequent use without failure. The present construction provides such a hinge.

Referring now to the drawings in detail, a spectacle frame hinge made in accordance with the present invention provides an oblong hollow enclosure 11 which is open at one side and at one end. The enclosure may be in the form of a separate housing, or may merely be an oblong hollow or cavity near one end of a temple, so that the hinge may be inserted into it and attached in place. The face of the enclosure 11 is open. It has an oblong concavity 12 or channel extending longitudinally therein. The channel serves as a seat, to position a helical spring 13. At each end of the channel 12, which does not extend full length in the enclosure, there are enlargements 14, 15 or mounds which define the ends of the channel 12. Each enlargement 14, 15 has a threaded passage 16 to receive a screw, whereby a cover plate 17 for the enclosure 11 can be secured in place. A flat plate 18 with a central longitudinal slot 19 is positioned in the housing. The slotted plate 18 serves as a spring retainer and as a mounting for a hinge. The slotted plate 18 has a wide portion 20 in the longitudinal oblong slot. The wide portion 20 of the slot receives the one enlargement 16 which is closest to the hinge in the enclosure. The outside end 21 of the slotted plate 18 engages the other enlargement 14. As a result, the slotted plate 18 can slide back and forth in the enclosure 11, limited however by the one enlargement 15 which is positioned in the slot, and stopped on the outside at one end by the other enlargement 14. The slot 19 in the plate lies over the oblong concavity 12 in the enclosure. At the end 21 of the slotted plate 18 which engages the one enlargement 14, the plate has a passage 22 which receives a pin 23. This pin 23 is a guide, or retainer, for the spring 13 which lies in the slot 19 in the plate 18, and lies on the oblong concavity 12; the spring 13 is carried by the pin 23. Thus, in order for the plate 18 to move, the spring 13 must be overcome; one end of the spring 13 bears on the enlargement 15 embraced by the wide portion 20 of the slot 19, and the other end of the spring bears on the end of the slot 19 in the plate 18. At the outer end of the plate 18 which extends out of the enclosure 11 or housing, a hinge element 24 is formed, preferably integral with the slotted plate 18. It joins with a corresponding hinge element on the lens mounting 25. There is a cover 17 which encloses the open face of the enclosure or housing 11. It has a pair of holes 5, 5 which receive screws that engage the threaded passages 16, 16 in the enlargements 14, 15. It also has a channel 26 to accommodate the spring 13. The enclosure 11 or housing is incorporated in a temple 27 of a spectacle frame, but positioned inwardly from the end thereof, so that an arcuate end 28 of the temple extends beyond the hinge to meet a concave end 29 of the mounting 25. The corresponding hinge element is attached to the mounting 25 for a pair of lenses. When the temple 27 is hinged outwardly, the arcuate end 28 will engage the end 29 of the lens mounting 25 before it is generally perpendicular to it. Thus it reaches the normal limit of hinging before perpendicularity. However, the hinging of the temple 27 may proceed further beyond its normal limit to a point of perpendicularity (or beyond) with respect to the mounting 25 by forcing the temple further in an outward direction. The arcuate end 28 engages the lens mounting 25. This overcomes the spring 13, and permits the slotted plate 18 which carries the hinge element 24 to slide in the enclosure 11 or housing to the limit of its movement as defined by the enlargement 20 in the slot 19. The spring 13 normally tends to return the plate 18 into the housing 11, and to pivot the temple 27 inwardly. This tendency causes the temple 27 to firmly engage the cranium and the pair of temples 27 of a lens mounting 25 thus maintaining the position of the lens mounting 25 high on the bridge of the nose.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What is claimed:

A spring loaded spectacle hinge comprising:

(a) an oblong hollow housing forming an enclosure open at one end and at the top, (b) an oblong concavity of arcuate cross-section in the lower wall of the housing for a helical spring,
(c) upstanding integral enlargements on the lower wall of the housing at each end of the oblong concavity defining supports for a cover,
(d) a plate disposed in sliding contact with the lower wall and the side walls of the housing and extending out of the open end of the housing,
(e) a longitudinal slot in the plate embracing the enlargement adjacent the open end of the housing,
(f) a pin located in the slot attached to the end of the plate remote from the open end of the housing and extending centrally of the slot toward the embraced enlargement,
(g) a helical spring having an outer diameter greater than the thickness of the plate positioned in the slot in the plate and carried by the pin so that one end of the spring engages the end of the slot in the plate remote from the open end of the housing and the other end of the spring engages the embraced enlargement and the spring normally urges the plate into the housing and in abutment with the other enlargement,
(h) a hinge element on the end of the slotted plate outside the enclosure,
(i) a flat cover for the open top of the hollow housing engaging the side walls of the housing and connected to the upstanding enlargements by screw means, the upper surface of the plate being in sliding contact with the cover,
(j) an oblong concavity of arcuate cross-section in the cover for the spring whereby in assembled position the upper and lower portions of the spring projecting beyond the upper and lower surfaces of the slotted plate are accommodated in the oblong concavities in the cover and in the housing for axial compression and expansion,
(k) a temple having a recess in which the hollow housing is fixed with the end of the temple extending beyond the hinge element and the housing cover facing outwardly from the recess in the temple,
(l) a mounting for a pair of lenses,
(m) the hinge element being pivotally joined to an associated hinge element attached to the mounting,
(n) the end of the temple engaging the mounting before the maximum degree of hinging desired of the temple is reached whereby further movement compresses the spring and permits the temple to hinge further outwardly.

References Cited by the Examiner

UNITED STATES PATENTS

| | | | |
|---|---|---|---|
| 2,874,609 | 2/1959 | Ducati | 88—53 |
| 2,976,766 | 3/1961 | Bianchi | 88—53 |
| 3,166,754 | 1/1965 | Stegeman | 351—153 |

FOREIGN PATENTS

| | | |
|---|---|---|
| 627,826 | 9/1961 | Canada. |
| 825,817 | 12/1959 | Great Britain. |
| 830,759 | 3/1960 | Great Britain. |
| 594,803 | 7/1959 | Italy. |

DAVID H. RUBIN, *Primary Examiner.*

JEWELL H. PEDERSEN, *Examiner.*

D. J. HOFFMAN, *Assistant Examiner.*